United States Patent [19]

Down et al.

[11] 4,388,417
[45] Jun. 14, 1983

[54] REGENERATION OF DEEP BED CONDENSATE POLISHERS

[75] Inventors: Peter E. Down, Summit; Eli Salem, Deal, both of N.J.

[73] Assignee: Ecodyne Corporation, Chicago, Ill.

[21] Appl. No.: 315,252

[22] Filed: Oct. 26, 1981

[51] Int. Cl.³ .............................................. B01J 49/00
[52] U.S. Cl. ....................................................... 521/26
[58] Field of Search ............................ 521/28, 27, 26

[56] References Cited

U.S. PATENT DOCUMENTS

| 2,666,741 | 1/1954 | McMullen | 521/28 |
| 3,582,504 | 6/1971 | Salem et al. | 521/33 |
| 3,826,761 | 7/1974 | Short | 521/33 |
| 4,264,439 | 4/1981 | Lefevre et al. | 210/675 |
| 4,298,696 | 11/1981 | Emmett | 521/26 |

Primary Examiner—Joseph L. Schofer
Assistant Examiner—Peter F. Kulkosky
Attorney, Agent, or Firm—Dressler, Goldsmith, Shore, Sutker & Milnamow, Ltd.

[57] ABSTRACT

A method for regenerating the exhausted anion and cation exchange resins in a mixed bed demineralizer which utilizes an inert material of a specific density intermediate to the specific densities of the anion and cation resins. The inert resin remains in the regeneration system and is not returned to the service vessel with the regenerated resin.

4 Claims, 1 Drawing Figure

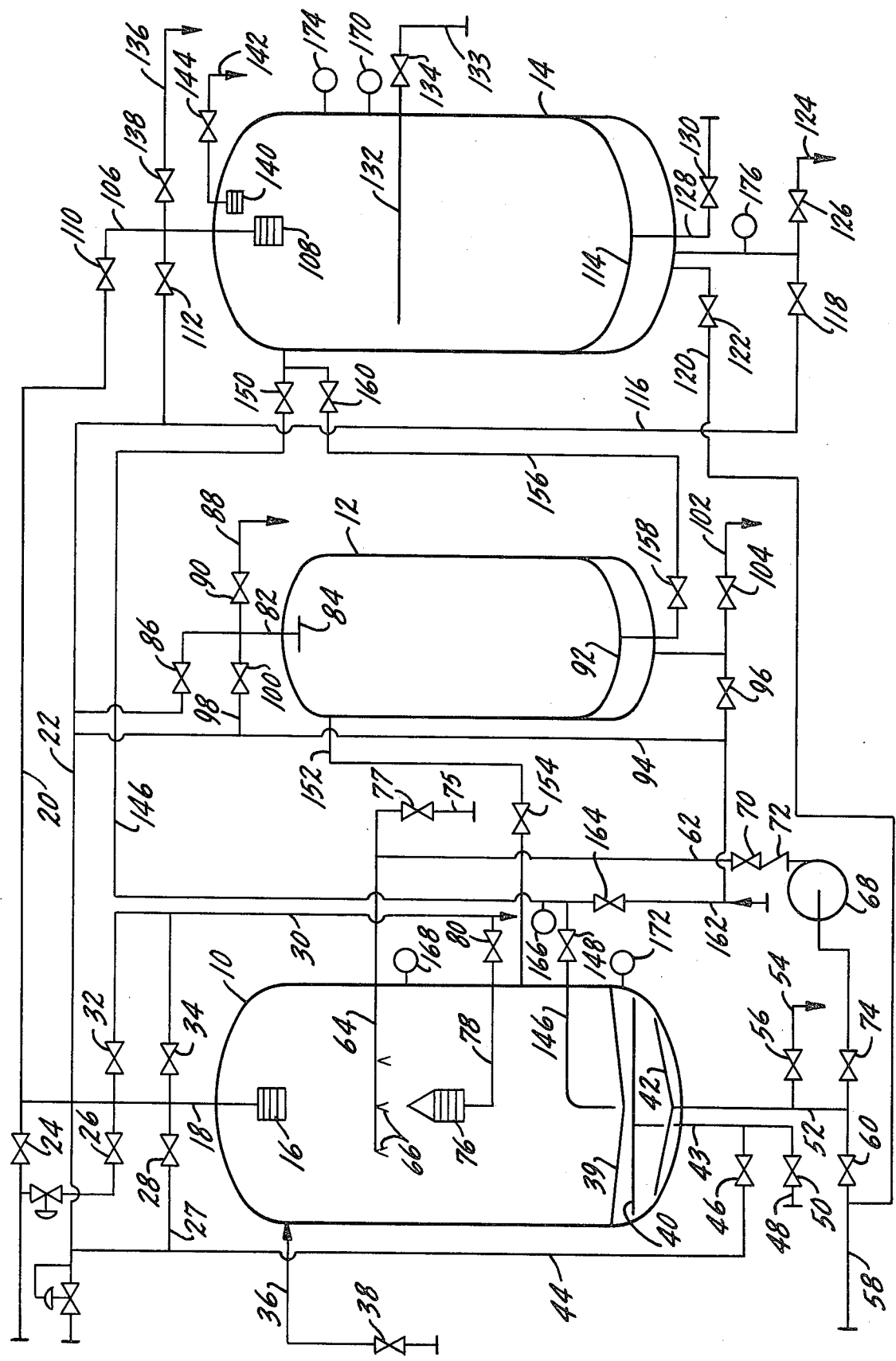

REGENERATION OF DEEP BED CONDENSATE POLISHERS

BACKGROUND OF THE INVENTION

The present invention relates to an improved method for regenerating the exhausted anion and cation exchange resins in a mixed bed demineralizer.

Mixed bed systems containing anion and cation exchange resins for the purification of water have many industrial applications. A primary application of such a system is in the purification of water for condensate recirculation systems used to drive steam turbines. It is essential that this water be of an extremely high purity level in order to avoid any adverse effects on the surfaces of turbine blades, boilers, pipes, etc. Since it is desired to produce water that is free of any residue upon evaporation, the cation exchange resin must be in the hydrogen or ammonium form, and the anion exchange resin must be in the hydroxide form. In any event, it is conventional to regenerate the cation exchange resin with a strong acid such as sulfuric or hydrochloric acid, and to regenerate the anion exchange resin with a strong base, generally sodium hydroxide.

It has heretofore been recognized that the in situ regeneration of anion and cation exchange resins in the service vessel is not practical. Therefore, it is necessary to transfer the resins from the service vessel to a specially designed regeneration station. There are various designs of external regeneration stations currently in use. One design regenerates both the cation and anion exchange resins in a single vessel. This type of system presents critical design problems to prevent the sodium hydroxide from contacting the cation resin and the sulphuric acid from contacting the anion exchange resin. Because of this design problem and certain operational problems the single vessel regeneration system has not found wide acceptance. Another design is a two vessel regeneration system in which the anion and cation resins are transferred into a separation/cation regeneration vessel. The resins are backwashed with water to expand the bed and classify the resins into an upper anion exchange resin layer and a lower cation exchange resin layer. The anion resin is then removed to an anion regeneration vessel where it is cleaned and regenerated. The cation resin is cleaned and regenerated in the separation/cation regeneration vessel. This design requires the complete separation of the anion exchange resin and the cation exchange resin. Various techniques have been used to effect such separation, including those disclosed in U.S. Pat. No. 3,385,787 to Crits et al, U.S. Pat. No. 3,429,807 to Burgess, U.S. Pat. No. 3,582,504 to Salem et al., U.S. Pat. No. 3,634,229 to Stanley Jr., U.S. Pat. No. 3,826,761 to Short, and U.S. Pat. No. 4,120,786 to Petersen et al. Although the above techniques have improved the degree of separation of the anion resin and the cation resin, they have not achieved complete separation. In practice, the consequence of imperfect separation is that a small proportion of the cation resin is inevitably saturated by the anion resin regenerant and conversely a small proportion of the anion resin is saturated by the cation resin regenerant. Both of which reduces the level of performance when the resins are returned to service.

In an effort to reduce the mixing of the anion resin and the cation resin at the interface between the resins after the backwash separation, it has been suggested to provide an intermediate layer of inert resin material of specific density intermediate the specific densities of the anion and cation resins. One example of such a system is disclosed in U.S. Pat. No. 2,666,741 to McMullen. The system disclosed in this patent hydraulically separates the resins in the service vessel into an upper anion resin layer, an intermediate inert resin layer and a lower cation resin layer. The anion resin and the cation resin are regenerated by passing sodium hydroxide regenerant into the inert layer and upwardly through the anion resin and passing acid regenerant into the inert layer and downwardly through the cation resin. Although this system provides advantages over other systems which regenerate in the service vessel, it has not solved many of the problems inherent in the regeneration of the anion resin and the cation resin in the service vessel. Also, the inert resin in the service vessel occupies space which can otherwise be occupied by additional anion and cation ion exchange resin. Accordingly, it is necessary to increase the size of the service vessel to make space for the inert resin.

The use of an intermediate density inert resin has also been heretofore disclosed in a two vessel regeneration system. Such a system is disclosed in British patent application No. 2,027,610. This system includes a separation/anion regeneration vessel and a cation regeneration vessel. The inert resin is mixed with the anion and cation resin in the service vessel. The resin from the service vessel is transferred into the separation/anion regeneration vessel wherein it is separated into an upper anion resin layer, an intermediate inert resin layer, and a lower cation resin layer. The cation resin layer is then hydraulically transferred to the cation regeneration vessel, leaving behind the anion resin and most of the inert resin. The anion resin is regenerated and rinsed in the separation/anion regeneration vessel and the cation resin is regenerated and rinsed in the cation regeneration vessel. The cation resin is then transferred back to the separation/anion regeneration vessel, wherein it is mixed with the anion resin and the inert resin and transferred back to a service vessel. This system also transfers the inert resin along with the anion and cation resin back into the service vessel and, thus, either results in reduced service capacity or requires an increase in the size of the service vessel. It should also be noted that the resin from each service vessel must include a quantity of inert resin. This system contemplates removal of any cation fines (heel) which are not separated out and transferred with the cation resin by the additional step of floating the anion resin in a saturated brine solution and removing the cation heel from the bottom of the separation/anion regeneration vessel.

SUMMARY OF THE INVENTION

It is a primary object of the present invention to provide a method of regenerating the anion and cation exchange resins in a mixed bed demineralizer which reduces the cross-contamination of the cation resin with the anion resin and the anion resin with the cation resin during their regeneration so as to attain higher quality treated water during the service cycle.

Another object of the invention is to provide a method of separating and isolating the anion resin from the cation resin from a mixed bed in a manner which attains complete separation even if the resins have a significant degree of fines.

A still further object of the invention is to provide a method of regenerating the anion and cation exchange resins from a mixed bed demineralizer utilizing an inert material of intermediate specific density to the specific density of the anion and cation exchange resins which does not return all the inert material to the service vessel.

Generally, the present invention provides an improved method of regenerating exhausted anion and cation exchange resins which utilizes an inert material of a specific density intermediate to the specific densities of the anion and cation resins to facilitate the separation of the anion resin and the cation resin. The inert resin remains in the regeneration system and is not returned to the service vessel with the regenerated resin. Also, the invention includes a means to separate out any cation fines which may be entrained in the anion resin after its separation from the cation resin and to retain the cation fines in the regeneration system.

Briefly stated, the method of the present invention provides for the transfer of the exhausted anion and cation resins from the service vessel to a separation/anion regeneration vessel which contains a quantity of inert resin of a specific density intermediate to the specific densities of the anion and cation resins. Following a sequence of wash, drain, and air scrub steps, the resins are backwashed from a bottom distributor to classify the resins into an upper anion resin layer, an intermediate inert resin layer, and a lower cation resin layer. The cation resin layer is then transferred from the bottom of the separation/anion regeneration vessel into a cation regeneration vessel. Upon completion of the cation resin transfer, the separation/anion regeneration vessel is drained and caustic soda of a concentration in the range of 10-18% is cycled therethrough, causing the anion resin to float and any traces of cation resin and the inert material to sink to the bottom of the vessel, leaving a layer of caustic soda inbetween. The floating anion resin is then transferred from the separation/anion regeneration vessel to an anion rinse vessel wherein it is suitably rinsed and held. The inert resin and the cation feel are obtained in the separation/anion regeneration vessel awaiting the delivery of the next exhausted resin change. The cation resin in the cation regeneration vessel is regenerated with sulfuric acid and rinsed in a conventional manner. The anion resin is then transferred from the anion rinse vessel to the cation regeneration vessel wherein it is air mixed with the cation resin and final rinsed, whereupon the mixed anion and cation resin is held awaiting transfer to a service vessel.

DESCRIPTION OF THE DRAWING

The FIGURE is a schematic representation of a regeneration station in which the method of the present invention may be employed.

DESCRIPTION OF A PREFERRED EMBODIMENT

The regeneration method in accordance with the present invention is hereinbelow disclosed in conjunction with a regeneration station apparatus schematically represented in the FIGURE. It will be readily realized by one skilled in the art that the regeneration method of the present invention may be utilized with alternative regeneration station apparatus. Accordingly, the disclosure of a specific regeneration station is for exemplary purposes only, and not to indicate a limitation as to the scope of the invention.

Referring to the FIGURE, a regeneration station is disclosed which includes a separation/anion regeneration vessel 10, an anion rinse vessel 12 and a cation regeneration vessel 14. Separation/anion regeneration vessel 10 has an upper distributor and strainer assembly 16 in communication with an upper inlet/outlet line 18. Line 18 is in communication with an air supply line 20, associated with an air supply source (not shown), a regenerated water supply line 22, associated with a regenerated water supply source (not shown) and an open drain line 30. Air supply line 20 is controlled by air inlet valves 24 and 26. A rinse water supply line 27 is controlled by a rinse inlet valve 28. Drain line 30 is controlled by backwash outlet valves 32 and 34. A resin inlet line 36 enters an upper portion of vessel 10 and is controlled by a resin transfer valve 38. Vessel 10 has an underdrain system which includes a barrier 39 permitting the passage of liquid therethrough while retaining ion exchange resins thereon. Below barrier 39 is a wash water distributor 40 and regenerant and rinse water collector 42. A lower inlet line 43 connects distributor 40 to line 22 through a backwash line 44 controlled by a backwash inlet valve 46. A conveying water inlet/outlet line 48, associated with a source of conveying water (not shown), is connected to lower inlet line 43 and is controlled by a motive water inlet valve 50. A lower inlet/outlet line 52, which extends downwardly from collector 42, is connected to a drain line 54, which is controlled by a drain valve 56. An air supply line 58, associated with an air supply source (not shown), is controlled by an air inlet valve 60 and is in communication with line 52. A caustic supply line 75, associated with a caustic supply source (not shown), is in communication with distributor 64 and is controlled by chemical inlet valve 77. A regenerant recirculation line 62 is provided to recirculate caustic regenerant received from collector 42 through line 52 and back through a mid-level distributor 64 within vessel 10. Distributor 64 preferably has nozzles 66 associated therewith to increase the velocity of the recycled regenerant. Line 62 has a recycle pump 68, a chemical inlet valve 70, a non-return valve 72, and an isolation valve 74 associated therewith. A middle system anion wash outlet strainer 76 is centrally positioned in vessel 10 in communication with a middle outlet line 78, which in turn is in communication with drain line 30. A middle system outlet valve 80 controls the flow through line 78.

The anion rinse vessel 12 has an upper inlet/outlet line 82, which is in communication with a top distributor 84 positioned therein. Line 82 is in communication with regenerated water supply line 22 through control valve 86 and an open drain line 88 through control valve 90. A rinse water supply line 98 is controlled by a top rinse inlet valve 100. Vessel 12 has a dish plate barrier 92, with suitable strainers associated therewith (not shown), to permit the passage of liquid therethrough while retaining ion exchange resins thereon. A backwash water line 94, controlled by bottom backwash inlet valve 96, enters the bottom of vessel 12 and is in communication with line 22. A drain line 102 is provided in communication with backwash line 94 and is controlled by drain valve 104.

The cation regeneration vessel 14 has an upper inlet/outlet line 106, which is in communication with an upper distributor and strainer assembly 108. Line 106 is in communication with air supply line 20 through air inlet control valve 110 and water supply line 22 through top rinse inlet valve 112. A dish plate barrier 114, with suitable strainers associated therewith (not shown), is provided in vessel 14 to permit the passage of liquid therethrough while retaining ion exchange resins thereon. A backwash water supply line 116, having a bottom backwash inlet control valve 118 associated therewith, is in communication with water supply line 22 and the bottom of vessel 14. An air inlet line 120, controlled by a bottom air inlet valve 122, extends between air supply line 58 and the bottom of vessel 14. A drain line 124, controlled by a drain valve 126 associated therewith, is provided in communication with the bottom of vessel 14. A resin outlet transfer line 128 communicates with the interior of vessel 14 above barrier 114 at its lowermost point and is controlled by a resin outlet valve 130. A mid-level acid regenerant distributor 132 is provided in vessel 14 in communication with a source of acid regenerant (not shown) through acid supply line 133, which is controlled by a chemical inlet valve 134. Vessel 14 has a drain line 136, controlled by backwash outlet valve 138, in communication with line 106. A vent and strainer assembly 140 is provided in communication with a vent line 142 through a vent valve 144.

A cation resin transfer line 146 is provided having one end in communication with the interior of vessel 10, a short distance above the lowermost point of barrier 39, and the other end in communication with an upper portion of vessel 14. The flow through transfer line 146 is controlled by resin transfer valves 148 and 150. An anion transfer line 152 extends between vessels 10 and 12 and is controlled by a resin transfer valve 154. A second anion transfer line 156 extends between barrier 92 in vessel 12 and an upper portion of vessel 14. The flow through transfer line 156 is controlled by resin transfer valves 158 and 160. A flush line 162, in communication with a source of regenerated water (not shown), is provided in communication with transfer line 146 between valves 148 and 150 and is controlled by a flush valve 164. Line 162 is also in communication with line 94 in front of valve 164. Various level switches and conductivity cells are provided in the vessels and lines which will be disclosed in the discussion of the method of the present invention which hereinbelow follows.

The method of regenerating exhausted anion and cation exchange resins in accordance with the present invention will now be described in a sequence of operations using the regeneration station disclosed in the FIGURE. At the start of the regeneration cycle, vessel 10 contains a charge of inert resin having a specific density intemediate to the specific densities of the cation and the anion resins to be regenerated. A sufficient quantity of inert resin is present in vessel 10 to permit a substantially pure inert resin layer to be formed between the anion layer and the cation layer after the separation thereof, in a manner which will be hereinbelow described. An example of such an inert resin is Ambersep Inert (R), which is manufactured by Rohm and Haas Company. The present invention contemplates the use of alternative inert materials known to those skilled in the art. Also within vessel 10 is a small amount of cation heel which is left behind from the prior regeneration cycle. Vessels 12 and 14 are empty at the start of the regeneration cycle. During each of the operative steps which are hereinbelow described, it shall be assumed that all of the valves are closed except those which are specifically recited as being open. The flow control valves each permit a flow determined by the operative step being performed.

At the start of the regeneration cycle, valves 34 and 38 are opened and the exhausted anion and cation resin is fluidized and transferred into vessel 10 through line 36. The resin bed within vessel 10 is then backwashed and classified to remove dirt particulates from the bed and to classify the resin bed by opening valves 46 and 32. The backwash water flows up from distributor 40 through the resin bed and out lines 18 and 30 to drain. The water flow is continued for a sufficient time to classify the resin bed into an upper anion resin layer, an intermediate inert resin layer, and a lower cation resin layer.

Upon completion of the classification of the resin within vessel 10, the cation resin is transferred from vessel 10 to the cation regeneration vessel 14. This is accomplished by opening valves 50, 148, 150, 138 and 126. Motive water enters the lower end of vessel 10 through lines 48 and 43 and distributor 40. The motive water carries the cation resin from the bottom of vessel 10 through transfer line 146 into vessel 14. The completion of the transfer of all the cation resin from vessel 10 to vessel 14 may be determined in many ways well known in the art. In accordance with the preferred embodiment shown in the FIGURE, a conductivity cell 166 is located in transfer line 146 to measure the conductivity of the slurry passing through line 146. Since the conductivity of the cation resin slurry is different from the conductivity of the inert resin slurry, the conductivity cell 166 is used to indicate when the slurry being transferred changes from cation resin to inert resin. The cation transfer step is terminated when the conductivity of the transfer slurry indicates that all of the cation resin has been removed from vessel 10. At this time it is preferable to flush line 146 in a suitable manner.

At this point, the vessel 10 contains anion resin, inert resin and a small amount of cation heel and vessel 14 contains the cation resin and a small amount of inert resin that may have been transferred therewith. The next series of operative steps are to get the anion resin in vessel 10 and the cation resin in vessel 14 ready for regeneration. In vessel 10 the water level is drained down to a level just above the bed level which is controlled by a level switch 168. This drain step is accomplished by opening valves 34 and 56. The resin bed in vessel 10 is then air scoured in a conventional manner by opening valves 60 and 34, providing air flow through line 58 into vessel 10 via collector 42 and out through line 18. Upon completion of the air scour, the bed is permitted to settle for a short period of time and backwashed by opening valves 46 and 80 to remove dirt particles from the bed. The anion bed in vessel 10 is now ready for regeneration. The cation resin bed in vessel 14 is similarly readied for regeneration. Vessel 14 is drained down to a level a short distance above bed level by opening valves 126 and 138 and draining until the level in vessel 14 reaches level switch 170. The cation resin bed is then air scoured by opening valves 122 and 138 in a conventional manner. The cation resin bed is permitted to settle and it is then backwashed to remove dirt particles therefrom by opening valves 118 and 138. The cation bed in vessel 14 is now ready for regeneration.

The anion resin is regenerated in vessel 10 through the following sequence of operational steps. Vessel 10 is drained down to a level at the bottom of the bed by opening valves 26 and 56. A level switch 172 is provided to terminate the drain step. The anion resin is regenerated by introducing caustic soda (sodium hydroxide) of a concentration in the range of 10–18% through line 75 and distributor 64 into vessel 10 by opening valves 77, 56 and 34. The caustic flows through vessel 10 and out drain line 56. The high density of the caustic causes the anion resin to float while any traces of cation resin (e.g. whole beads, fines or broken pieces) and inert resin sink to the bottom of vessel 10, leaving a clear layer of caustic soda inbetween. In order to improve the drop out of the entrained resin, the caustic soda can be recycled externally of vessel 10 and pumped back to the caustic distributor 64. This step introduces turbulence into the floating anion resin layer. This recycle step is initiated by opening valves 70 and 74 and turning on recirculation pump 68. The floating anion resin is then transferred from vessel 10 into vessel 12, which is sized to hold a complete charge of anion. The transfer is accomplished by opening valves 26, 154, 102, and 90, which permits the transfer of the floating anion through transfer line 152, which enters vessel 10 at a level a short distance below the lower level of the floating anion. The inert resin and the cation heel are retained in vessel 10 awaiting the arrival of the next charged of exhausted resin.

The cation resin is regenerated in vessel 14 at the same time as the anion resin is regenerated in vessel 12. The cation resin in vessel 14 is regenerated in a conventional manner by passing an acid regenerant (i.e. 10% sulphuric acid) through the resin bed by opening valves 134 and 126. The regenerant acid enters vessel 14 through distributor 132 and exits through drain line 124.

The regenerated anion resin bed in vessel 12 and the regenerated cation resin bed in vessel 14 are rinsed in a conventional manner. Upon completion of the rinsing of the anion and cation resin beds, the anion resin bed in vessel 12 is transferred to vessel 14. This is accomplished by opening valves 86, 96, 158, 160, 138 and 126 to initiate a water transfer of the anion resin bed from the bottom of vessel 12. The anion resin is transferred through line 156 and is joined with the cation resin in vessel 14. The liquid level in vessel 14 is then partially drained down to the level of level switch 174 by opening valves 138 and 126. The resin bed in vessel 14 is air mixed in a conventional manner by opening valves 122 and 138 and starting a blower motor associated with line 58. Vessel 14 is drained down and the resin bed is then subjected to a slow refill step and a fast refill step by suitably opening valves 112 and 144. The mixed anion and cation resin bed is then final rinsed by opening valves 112 and 126. The rinse water enters through line 106 and exits through dish plate 114 and drain line 124. The final rinse step is continued until the conductivity of the rinse water passing through outlet line 124 is approximately 0.5 micromhos as measured by conductivity probe 176 in line 124. The regenerated bed of mixed cation and anion resin can be kept on stand-by in vessel 14, from where it can be transferred to a service vessel following transfer of the next exhausted charge to vessel 10. Alternatively, the resin bed can be transferred from vessel 14 to a storage vessel where it can be held until required to be transferred to a service vessel.

At such time as the anion and cation resin is being air mixed and rinsed in vessel 14, the inert resin and the cation heel in vessel 10 is rinsed by opening valves 46 and 34. The inert resin and the cation heel are retained in vessel 10 awaiting the arrival of the next exhausted charge of anion and cation resin.

The method of regenerating anion and cation resins in accordance with the hereinabove described procedure reduces cross-contamination of the cation resin with the anion resin and the anion resin with the cation resin during regeneration and enables a higher quality treated water to be obtained in both the H/OH and $NH_4$/OH cycles. The method of the present invention also reduces the quantity of expensive inert resin which is used to facilitate separation of the anion and cation resins by retaining the inert resin in the separation vessel and not returning it to service. This feature additionally permits the use of a greater amount of anion and cation resin in a service vessel of a given volume which increases the ion exchange capacity of the service vessel.

Obvious modifications of the aforementioned method will occur to those skilled in the art. It is intended by the appended claims to cover all such modifications coming within the proper scope of the invention.

What is claimed is:

1. A method for regenerating a mixture of anion and cation exchange resins from a mixed bed demineralizer, comprising:

transferring the exhausted anion and cation resins into a separation vessel having a quantity of inert material therein whose specific density is intermediate to the specific densities of the anion and cation resins;

passing a backwash liquid through the separation vessel so as to separate the resins into an upper anion resin layer, an intermediate inert material layer and a lower cation resin layer;

transferring the cation resin from the bottom of the separation vessel to a cation regeneration vessel, leaving the anion resin and substantially all of the inert material in the separation vessel;

passing a regenerant liquid through the separation vessel to regenerate and float the anion resin;

transferring the floating anion resin from the separation vessel to an anion rinse vessel, leaving the inert material and any not previously transferred cation resin in the separation vessel;

rinsing the anion resin within the anion rinse vessel;

passing a regenerant liquid through the cation regeneration vessel to regenerate the cation resins;

rinsing the cation resin within the cation regeneration vessel; and transferring the anion resin from the anion rinse vessel to the cation regeneration vessel.

2. The method as defined in claim 1 further including the step of rinsing the inert material and any not previously transferred cation resin remaining in the separation vessel.

3. The method as defined in claim 1 wherein the regenerant liquid passing through the separation vessel is a sodium hydroxide solution in the range of 10–18 percent concentration which causes the anion resin to float, the inert material and any not previously transferred cation resin to sink and a layer of sodium hydroxide regenerant inbetween.

4. The method as defined in claim 3 including the step of withdrawing the sodium hydroxide solution from the bottom of the separation vessel and recycling it back down through the separation vessel to increase the settling of any inert material or cation resin entrained in the anion resin.

* * * * *